US010182060B2

(12) United States Patent
Lee et al.

(10) Patent No.: US 10,182,060 B2
(45) Date of Patent: Jan. 15, 2019

(54) METHOD AND APPARATUS FOR DOWNLOADING PROFILE ON EMBEDDED UNIVERSAL INTEGRATED CIRCUIT CARD OF TERMINAL

(71) Applicant: Samsung Electronics Co., Ltd., Suwon-si, Gyeonggi-do (KR)

(72) Inventors: Hye-Won Lee, Seoul (KR); Jong-Han Park, Bucheon-si (KR); Duckey Lee, Seoul (KR); Sang-Soo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 15/350,963

(22) Filed: Nov. 14, 2016

(65) Prior Publication Data

US 2017/0142121 A1    May 18, 2017

Related U.S. Application Data

(60) Provisional application No. 62/254,944, filed on Nov. 13, 2015.

(51) Int. Cl.
*G06F 21/60* (2013.01)
*H04L 29/06* (2006.01)
(Continued)

(52) U.S. Cl.
CPC ........ *H04L 63/102* (2013.01); *H04L 63/0428* (2013.01); *H04L 63/0823* (2013.01);
(Continued)

(58) Field of Classification Search
CPC ............ H04L 63/0823; H04L 63/0428; H04L 63/0876
(Continued)

(56) References Cited

U.S. PATENT DOCUMENTS

| 9,009,475 B2 | 4/2015 | Hauck et al. |
| 2002/0126850 A1* | 9/2002 | Allen .................... H04L 9/0825 380/277 |

(Continued)

FOREIGN PATENT DOCUMENTS

WO    2012/017059 A1    2/2012

OTHER PUBLICATIONS

Embedded SIM Remote Provisioning Architecture dated Jan. 30, 2014 GSM Association.

(Continued)

*Primary Examiner* — Haresh N Patel
(74) *Attorney, Agent, or Firm* — Jefferson IP Law, LLP

(57) ABSTRACT

A method for downloading a profile on an embedded universal integrated circuit card (eUICC) of a terminal is provided. The method includes transmitting a profile request containing eUICC authentication information to a profile providing server through a security channel, upon receiving, from the profile providing server, profile-related information generated in response to the profile request, displaying non-encrypted profile information contained in the profile-related information on a screen, identifying whether a user input indicating whether to proceed to download the profile is detected, and downloading the profile, corresponding to the identified user input.

20 Claims, 9 Drawing Sheets

(51) Int. Cl.
*H04W 12/06* (2009.01)
*H04W 12/08* (2009.01)
*H04L 29/08* (2006.01)
*H04W 8/20* (2009.01)

(52) U.S. Cl.
CPC .......... *H04L 63/0876* (2013.01); *H04L 67/36* (2013.01); *H04W 8/205* (2013.01); *H04W 12/06* (2013.01); *H04W 12/08* (2013.01)

(58) Field of Classification Search
USPC ........................................................... 726/4
See application file for complete search history.

(56) References Cited

U.S. PATENT DOCUMENTS

| | | | | |
|---|---|---|---|---|
| 2012/0260086 A1* | 10/2012 | Haggerty | .............. | H04W 8/265 713/150 |
| 2012/0260090 A1* | 10/2012 | Hauck | ................ | H04L 63/0853 713/168 |
| 2012/0331292 A1* | 12/2012 | Haggerty | ............ | H04L 63/0272 713/168 |
| 2013/0326614 A1* | 12/2013 | Truskovsky | ............ | G06F 21/44 726/19 |
| 2014/0073292 A1 | 3/2014 | Kim et al. | | |
| 2014/0143826 A1* | 5/2014 | Sharp | .................... | G06F 21/604 726/1 |
| 2014/0219447 A1 | 8/2014 | Park et al. | | |
| 2015/0143125 A1* | 5/2015 | Nix | ........................ | H04W 4/70 713/171 |
| 2015/0281942 A1 | 10/2015 | Lee et al. | | |
| 2015/0303966 A1 | 10/2015 | Lee et al. | | |
| 2015/0341791 A1* | 11/2015 | Yang | ..................... | H04W 12/06 713/159 |
| 2016/0021484 A1* | 1/2016 | Park | ........................ | H04W 4/70 455/418 |
| 2016/0352698 A1* | 12/2016 | Long | ..................... | H04W 12/08 726/1 |
| 2017/0332312 A1* | 11/2017 | Jung | ........................ | H04W 8/20 726/1 |

OTHER PUBLICATIONS

RSP Architecture Version 1.0 Official Document SGP.21-RSP Architecture dated Dec. 23, 2015.
European Search Report dated Sep. 25, 2018, issued in European Application No. 16864623.0-1213/3375165.

* cited by examiner

METHOD AND APPARATUS FOR DOWNLOADING PROFILE ON EMBEDDED UNIVERSAL INTEGRATED CIRCUIT CARD OF TERMINAL

CROSS-REFERENCE TO RELATED APPLICATION(S)

This application claims the benefit under 35 U.S.C. § 119(e) of a U.S. Provisional application filed on Nov. 13, 2015 in the United States Patent and Trademark Office and assigned Ser. No. 62/254,944, the entire disclosure of which is incorporated by reference.

TECHNICAL FIELD

The present disclosure relates to methods and apparatuses for downloading and installing profiles for communication service connection on embedded universal integrated circuit cards (eUICCs) of terminals.

BACKGROUND

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra high frequency bands (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid frequency shift key (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of things (IoT) network by which information is communicated and processed between things or other distributed components. Another arising technology is the Internet of everything (IoE), which is a combination of the big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC). In the IoT environment may be offered intelligent Internet technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, M2M, MTC, or other 5G techniques are implemented by schemes, such as beamforming, MIMO, and array antenna schemes. The above-mentioned application of the cloud RAN as a big data processing technique may be said to be an example of the convergence of the 5G and IoT technologies.

The universal integrated circuit card (UICC) is a smart card inserted into, e.g., a mobile communication terminal, and this is also called the UICC card. The UICC may include an access control module for accessing a mobile communication service provider's network. Examples of such access control module include the universal subscriber identity module (USIM), the subscriber identity module (SIM), and the Internet protocol multimedia service identity module (ISIM). The UICC including a USIM is typically referred to as a USIM card. Likewise, the UICC including a SIM is typically named an SIM card. As described hereinafter, the term "SIM card" may encompass, in its meaning, a UICC card, USIM card, or UICC having an ISIM. In other words, the technology for SIM cards may apply likewise to USIM cards, ISIM cards, or other common UICC cards.

A SIM card stores personal information about a mobile communication service subscriber, and upon access to a mobile communication network, authenticates the subscriber, and generates a traffic security key, enabling safe use of mobile communication services.

SIM cards are manufactured as dedicated cards for a particular mobile communication service provider at his request, and they are equipped with authentication information for access to the network of the service provider, such as a USIM application and international mobile subscriber identity (IMSI), K value, and OPc value, before they are shipped out. The SIM cards so manufactured are delivered to the mobile communication service provider and then distributed to subscribers. Applications may be managed, e.g., installed, modified, or deleted in the UICC by utilizing, e.g., over the air (OTA) technique, as required to be done so later. A subscriber may receive network and application services of the service provider through his terminal with the UICC card inserted. Also, upon attempting to use a new terminal, the subscriber may avail himself of the authentication information, phone number, and contacts stored in the UICC card through the new terminal by simply putting the UICC card in the new device.

Such conventional SIM cards are difficult to use when the terminal users attempt to receive services from other mobile communication service providers. A user who is being served mobile communication services from one service provider should obtain a SIM card from another service provider to receive services from the other service provider. For example, a user traveling a foreign country, in order to receive mobile communication services there, needs to purchase an SIM card provided by a local mobile communication service provider in the country and insert it in his terminal. This, however, is quite bothering. A roaming service may relieve the user's such hassle by allowing him to stay in service through the mobile service provider serving him in his home country, but may charge him at a significantly high rate or leave the user out of service if there is no association between the service provider in the home country and a local service provider.

Therefore, a need exists for techniques allowing a SIM card to support various mobile communication services.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for downloading, in real-time, a profile for communication connection to a selected communication service on an embedded universal integrated circuit board (eUICC) of a terminal.

Another aspect of the present disclosure is to provide a method and apparatus for downloading a secured profile on an eUICC of a terminal.

In accordance with an aspect of the present disclosure, a method for downloading a profile on an eUICC of a terminal is provided. The method includes transmitting a profile request containing eUICC authentication information to a profile providing server through a security channel, upon receiving, from the profile providing server, profile-related information generated in response to the profile request, displaying non-encrypted profile information contained in the profile-related information on a screen, identifying whether a user input indicating whether to proceed to download the profile is detected, and downloading the profile, corresponding to the identified user input.

In accordance with another aspect of the present disclosure, a method for providing by a server a profile for an eUICC is provided. The method includes when receiving a profile request containing eUICC authentication information from a terminal through a security channel, generating profile-related information containing non-encrypted profile information and transmitting the profile-related information to the terminal in response to the profile request, identifying whether a request for proceeding to download the non-encrypted profile information contained in the profile-related information is received from the terminal, and upon receiving the request for proceeding to download, transmitting encrypted profile information to the terminal.

In accordance with another aspect of the present disclosure, a terminal downloading a profile on an eUICC is provided. The terminal includes a transceiver configured to transmit a profile request containing eUICC authentication information to a profile providing server through a security channel, a display configured to, upon receiving, from the profile providing server, profile-related information generated in response to the profile request, displaying non-encrypted profile information contained in the profile-related information on a screen, and a processor configured to identify whether a user input indicating whether to proceed to download the profile is detected, and download the profile, corresponding to the identified user input.

In accordance with another aspect of the present disclosure, a server providing a profile for an eUICC is provided. The server includes a transceiver configured to, upon receiving a profile request containing eUICC authentication information from a terminal through a security channel, generate profile-related information containing non-encrypted profile information, and transmit the profile-related information to the terminal in response to the profile request and a processor configured to identify whether a request for proceeding to download the non-encrypted profile information contained in the profile-related information is received from the terminal, and upon receiving the request for proceeding to download, control the transceiver to transmit encrypted profile information to the terminal.

Objects of the present disclosure are not limited to the foregoing, and other unmentioned objects would be apparent to one of ordinary skill in the art from the following description. Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "processor" may mean any device, system, or part thereof controlling at least one operation. As used herein, the term "device" may be implemented in hardware, firmware, software, or some combinations of at least two thereof. It should be noted that functions, whatever particular processor is associated therewith, may be concentrated or distributed or implemented locally or remotely. It should be appreciated by one of ordinary skill in the art that the definitions of particular terms or phrases as used herein may be adopted for existing or future in many cases or even though not in most cases.

According to an embodiment of the present disclosure, in a process for downloading and installing a profile for a communication service on a terminal in a communication system, unencrypted profile information is delivered to the terminal before an encrypted profile is transferred to the terminal. The user may prevent unnecessary profiles from being downloaded by making a selection as to whether to use a corresponding profile, leading to a reduction in resource waste.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
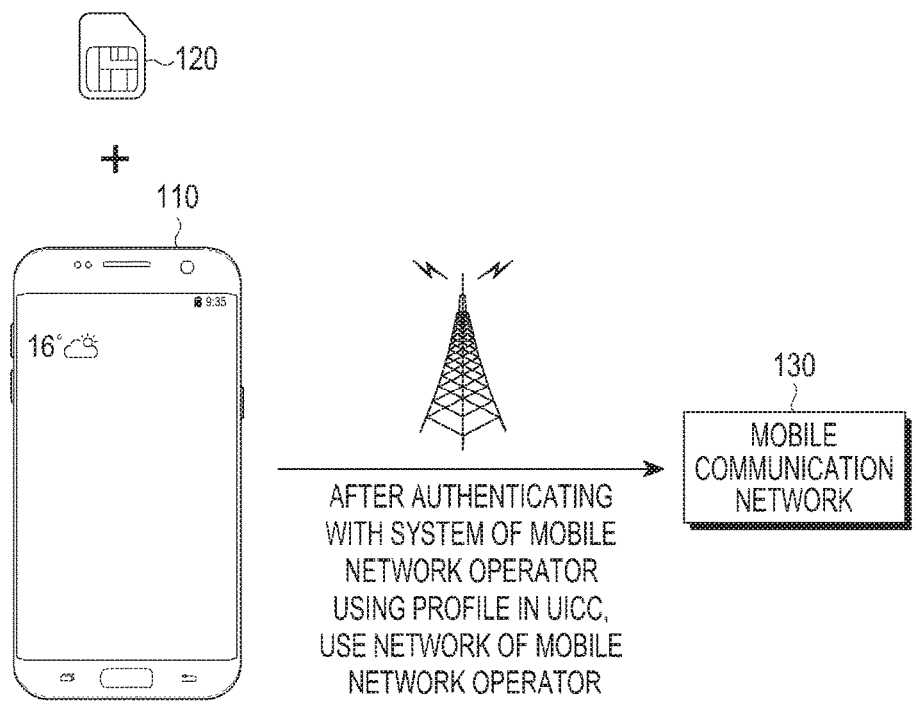
FIG. 1 is a view illustrating a method allowing a terminal using a universal integrated circuit card (UICC) equipped with a fixed profile to connect with a mobile communication network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various changes may be made to the present disclosure, and the present disclosure may come with a diversity of embodiments. Some embodiments of the present disclosure are shown and described in connection with the drawings. However, it should be appreciated that the present disclosure is not limited to the various embodiments, and all changes and/or equivalents or replacements thereto also belong to the scope of the present disclosure.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

Unless otherwise defined in connection with various embodiments of the present disclosure, all terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may include a communication function. For example, the electronic device may be a smartphone, a tablet personal computer (PC), a PC, a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital versatile disc (DVD) player, an audio player, a refrigerator, an air conditioner, a vacuum cleaner, an oven, a microwave oven, a washer, a drier, an air cleaner, a set-top box, a television (TV) box (e.g., Samsung HomeSync™, Apple TV™, or Google$^{TV}$), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the disclosure, an electronic device may be a combination of the above-listed devices. It should be appreciated by one of ordinary skill in the art that the electronic device is not limited to the above-described devices.

According to an embodiment of the present disclosure, a terminal as used herein may be the above-described electronic device or a combination of electronic devices as set forth above.

Hereinafter, the terms used herein are defined.

As used herein, the term "universal integrated circuit card (UICC)" means a smart card inserted and used in a mobile communication terminal, storing personal information about a mobile communication service subscriber, such as network access authentication information, phone number, or short message service (SMS), and enabling safe use of mobile communication services by authenticating the subscriber and generating a traffic security key when accessing a mobile communication network, such as a global system for mobile communication (GSM), wideband code division multiple access (WCDMA), or long-term evolution (LTE) network. The UICC may be equipped with a communication application, such as a subscriber identification module (SIM), universal SIM (USIM), or internet protocol (IP) multimedia SIM (ISIM), depending on the type of a mobile communication network accessed by the subscriber and may provide a high-level security function for equipping itself with various applications, such as electronic wallets, tickets, or electronic passports.

According to the present disclosure, an SIM may remotely be downloaded and installed on the UICC card. In such case, the user may download a SIM for a mobile communication service he intends to use on the UICC card at a time he desires to do so. Further, the UICC card may download and install a plurality of SIMs thereon and choose and use one of the SIMs. Such UICC card may be fixed, or not, to the terminal. In particular, a UICC used fixed to a terminal is called an embedded UICC (eUICC). Typically, the eUICC means a UICC that is used fixed to a terminal and may remotely download and choose a SIM. Hereinafter, UICC cards capable of remotely downloading and choosing a SIM are collectively referred to as an eUICC. In other words, among UICC cards capable of remotely download and choose a SIM, ones fixed or not fixed to a terminal are collectively denoted an eUICC. Also, SIM information downloaded is collectively denoted an eUICC profile.

As used herein, an eUICC is a security module embedded in a terminal, rather than one detachably inserted into a terminal. The eUICC may download and install a profile using an over-the-air (OTA) technique. The eUICC may refer to a UICC capable of downloading and installing a profile.

As used herein, a method for downloading and installing a profile on the eUICC using an OTA technique may also be applicable to detachable UICCs detachably inserted into terminals. That is, various embodiments of the present disclosure may apply to UICCs capable of downloading and installing a profile using an OTA technique.

As used herein, the term "UICC" may be interchangeably used with the term "SIM," and the term "eUICC" may be interchangeably used with the term "eSIM."

As used herein, the term "profile" may mean one obtained by packaging an application, file system, authentication key value or so stored in a UICC into a software form.

As used herein, the term "USIM profile" may have the same meaning as the term "profile" or may mean one obtained by packaging information contained in a USIM application in a profile into a software form.

As used herein, the term "profile providing server" may be interchangeably used with subscription manager data preparation (SM-DP), subscription manager data preparation plus (SM-DP+), off-card entity of profile domain, profile encrypting server, profile generating server, profile provisioner (PP), profile provider, or profile provisioning credentials (PPC) holder As used herein, the term "profile managing server" may be interchangeably used with subscription manager secure routing (SM-SR), subscription manager secure routing plus (SM-SR+), off-card entity of eUICC profile manager, profile management credentials (PMC) holder, or eUICC manager (EM).

As used herein, the term "profile providing server" may collectively refer to ones adding all the functions of the profile managing server. According to an embodiment of the present disclosure, operations of the profile providing server, which are described below, may thus be performed by the profile managing server as well. Likewise, operations of the profile managing server or SM-SR, which are described below, may also be performed by the profile providing server.

According to the present disclosure, the terminal may have an UICC embedded which may download and install a profile. When no UICC is embedded in the terminal, a UICC physically separated from the terminal may be inserted and connected to the terminal. For example, a card-type UICC may be inserted into the terminal. In this case, the terminal may be a terminal including a UICC capable of downloading and installing a profile. The UICC capable of downloading and installing a profile may be denoted, e.g., eUICC.

Hereinafter, the terminal according to the present disclosure may include software or an application capable of controlling the UICC or eUICC. The software or application may be denoted, e.g., local profile assistant (LPA).

As used herein, the term "profile differentiator (or profile delimiter)" may be interchangeably used with profile identifier (profile ID), integrated circuit card ID (ICCID), matching ID, event identifier (event ID), activation code, activation code token, ISD-P or a factor matching a profile domain (PD). The profile ID may denote a unique ID of each profile. The profile differentiator may contain an address of the profile providing server (SM-DP+) capable of indexing a profile.

As used herein, the eUICC identifier (eUICC ID) may be a unique identifier of the eUICC embedded in the terminal or may also be denoted an EID. Further, when a provisioning file is previously included in the eUICC, the eUICC ID may be an ID of the provisioning profile. According to an embodiment of the present disclosure, when the terminal is not separated from the eUICC, the eUICC ID may be a terminal ID. Also, the eUICC ID may denote a particular security domain of the eUICC chip.

As used herein, the term "profile container" may also be denoted a profile domain. The profile container may be a security domain.

As used herein, an application protocol data unit (APDU) may be a message for the terminal to interwork with the eUICC. Also, APDU may be a message for the PP or PM to interwork with the eUICC.

As used herein, a profile provisioning credentials (PPC) may be a means used to perform authentication, profile encryption, or signature between the profile providing server and the eUICC. The PPC may include one or more of a symmetric key, a Rivest Shamir Adleman (RSA) certificate and private key, elliptic curved cryptography (ECC) certificate and private key, a root certification authority (CA) and certificate chain. Further, when there are provided a plurality of profile providing servers, a different PPC for each of the plurality of profile providing servers may be stored in the eUICC or may be used.

As used herein, the profile management credentials (PMC) may be a means used to perform authentication, transmission data encryption, or signature between the profile managing server and the eUICC. The PMC may include one or more of a symmetric key, RSA certificate and private key, ECC certificate and private key, and root CA and certificate chain. Further, when there are provided a plurality of profile managing servers, a different PMC for each of the plurality of profile managing servers may be stored in the eUICC or may be used.

As used herein, the AID may be an application identifier. This value may be a differentiator differentiating between different applications in the eUICC.

As used herein, the term "profile package tag-length-value (TLV)" may be interchangeably used with the term "profile" or may be used to denote a data object of a particular profile or may also be referred to as a profile TLV or profile package (PP). A profile package TLV encrypted using an encryption parameter, may be denoted a protected profile package (PPP) TLV or PPP. A profile package TLV encrypted using an encryption parameter that is decoded only by a particular eUICC may be denoted a bound profile package (RPP) TLV or BPP. The profile package TLV may be a data set representing information constituting a profile in a TLV format.

As used herein, the AKA may denote an authentication and key agreement and may represent an authentication algorithm for accessing a $3^{rd}$ generation partnership project (3GPP) and 3GPP2 network.

As used herein, K is an encryption key value stored in the eUICC used in an AKA authentication algorithm.

As used herein, OPc is a parameter value storable in the eUICC used in an AKA authentication algorithm.

As used herein, NAA may be a network access application program and may be an application program such as a USIM or ISIM stored in the UICC to access a network. NAA may be a network access module.

When determined to make the subject matter of the present disclosure unclear, the detailed description of the known art or functions may be skipped.

Hereinafter, methods and apparatuses for safely providing profiles to terminals in communication systems are described according to various embodiments of the present disclosure. Specifically, there are proposed specific procedures for defining encryption parameters upon mutual authentication and profile encryption for downloading a profile between terminal and profile managing server.

FIG. 1 is a view illustrating a method allowing a terminal using a UICC equipped with a fixed profile to connect with a mobile communication network according to an embodiment of the present disclosure.

Referring to FIG. 1, as an example, a UICC 120 equipped with a fixed profile may be inserted into a terminal 110. In this case, the UICC 120 may be of a detachable type or may be one previously embedded in the terminal 110. The fixed profile equipped in the UICC 120 means that it stores "access information" enabling access to a particular mobile communication network 130. The access information may be, e.g., an IMSI, subscriber identifier, and a K or Ki value necessary to authenticate on the network along with the subscriber identifier.

Then, the terminal 110, together with an authentication processing system of the mobile communication network 130, e.g., a home location register (HLR) or AuC, corresponding to the access information, may perform an authentication procedure using the UICC 120. Here, an example of the authentication procedure may be an AKA process. When the authentication procedure succeeds, the terminal 110 may make use of mobile communication services, e.g., call or mobile data services, provided through the mobile communication network 130.

Figure 2:
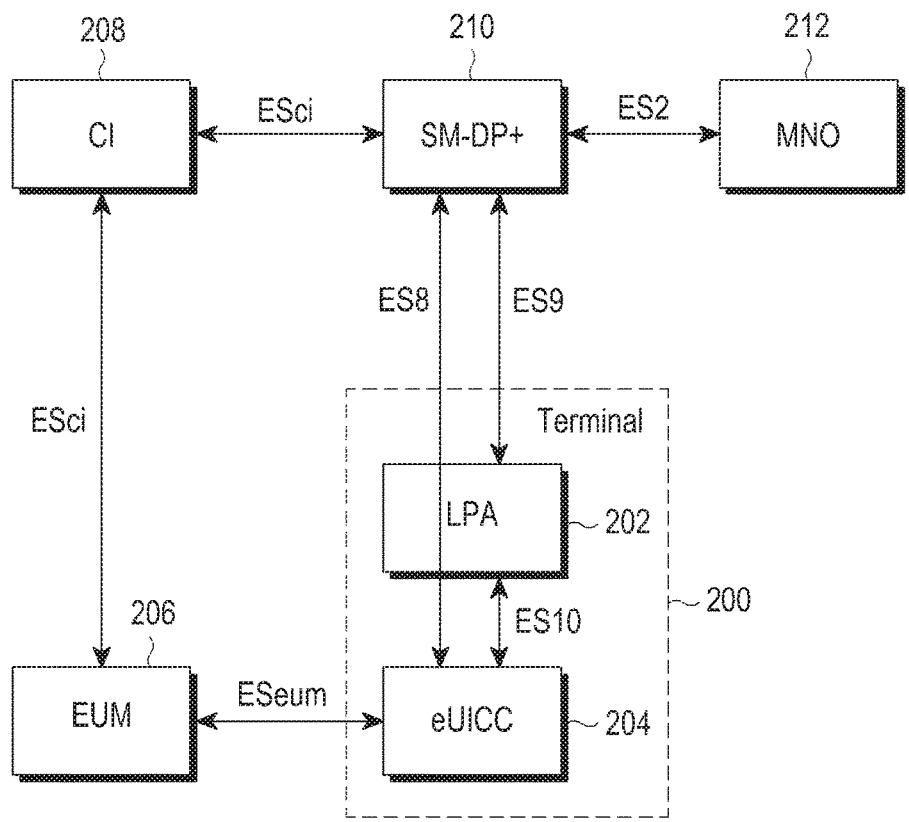
FIG. 2 is a view illustrating an overall configuration of a system allowing an embedded UICC (eUICC) to download a profile from a profile providing server according to an embodiment of the present disclosure.

FIG. 2 illustrates an example of an overall system configuration for a terminal to download a profile from a profile providing server onto an eUICC inserted or embedded in the terminal according to an embodiment of the present disclosure.

Referring to FIG. 2, the overall system may include, e.g., a terminal 200, an eUICC manufacturer (EUM) 206, a certificate issuer (CI) 208, a profile providing server (SM-DP+) 210, and a mobile network operator (MNO) 212.

The terminal 200 has an eUICC 204 mounted or embedded therein. Here, the eUICC 204, e.g., as a UICC card or chip, may presumably be a UICC that may have various unspecified physical dimensions as well as specified form factors such as 2FF, 3FF, 4FF, MFF1, and MFF2. Further, according to an embodiment of the present disclosure, the eUICC may be embedded separately from the terminal or may also be integrated with a communication chip (typically, a baseband modem) of the terminal. The terminal 200 contains an LPA 202. Operations of the LPA 202 are described below with reference to FIGS. 3A to 3C. The profile providing server (SM-DP+) 210 may have the functions of generating a profile or profile package to be downloaded onto a target eUICC, encrypting the generated profile, and transferring the generated profile to the target eUICC. The profile providing server (SM-DP+) 210 may also be denoted a profile provider. The profile providing server (SM-DP+) 210 may be integrated with the profile managing server (SM-SR or SM-SR+) or the profile manager.

The EUM 206 denotes an IT system from the manufacturer of the eUICC in a reference architecture. An EUMID, as a unique global identifier for each EUM, is defined. The format of an eUMID, as a part of an eUICC ID (EID), is defined in GSMA SGP0.2 v3. The EUM plays a role as a sub-CA by displaying eUICC certificates with private keys of EUM certificates. The EUM certificates are issued from the CI 208.

The CI 208 issues certificates to the profile providing server (SM-DP+) 210 and EUM 206. An entity required to authenticate or examine another entity based on a certificate issued from the CI 208 should have a CI certificate before the authentication or examine. According to an embodiment of the present disclosure, one or more such CIs may be present in an eSIM echo system. Functional entities in the eSIM echo system may support multiple certificates and public key to examine certificates issued by other CIs.

The MNO 212 may be integrated with the profile providing server 210 to manage subscriptions to mobile communication services in order to manage an eUICC associated with subscription to the corresponding mobile communication network.

Figure 3A:
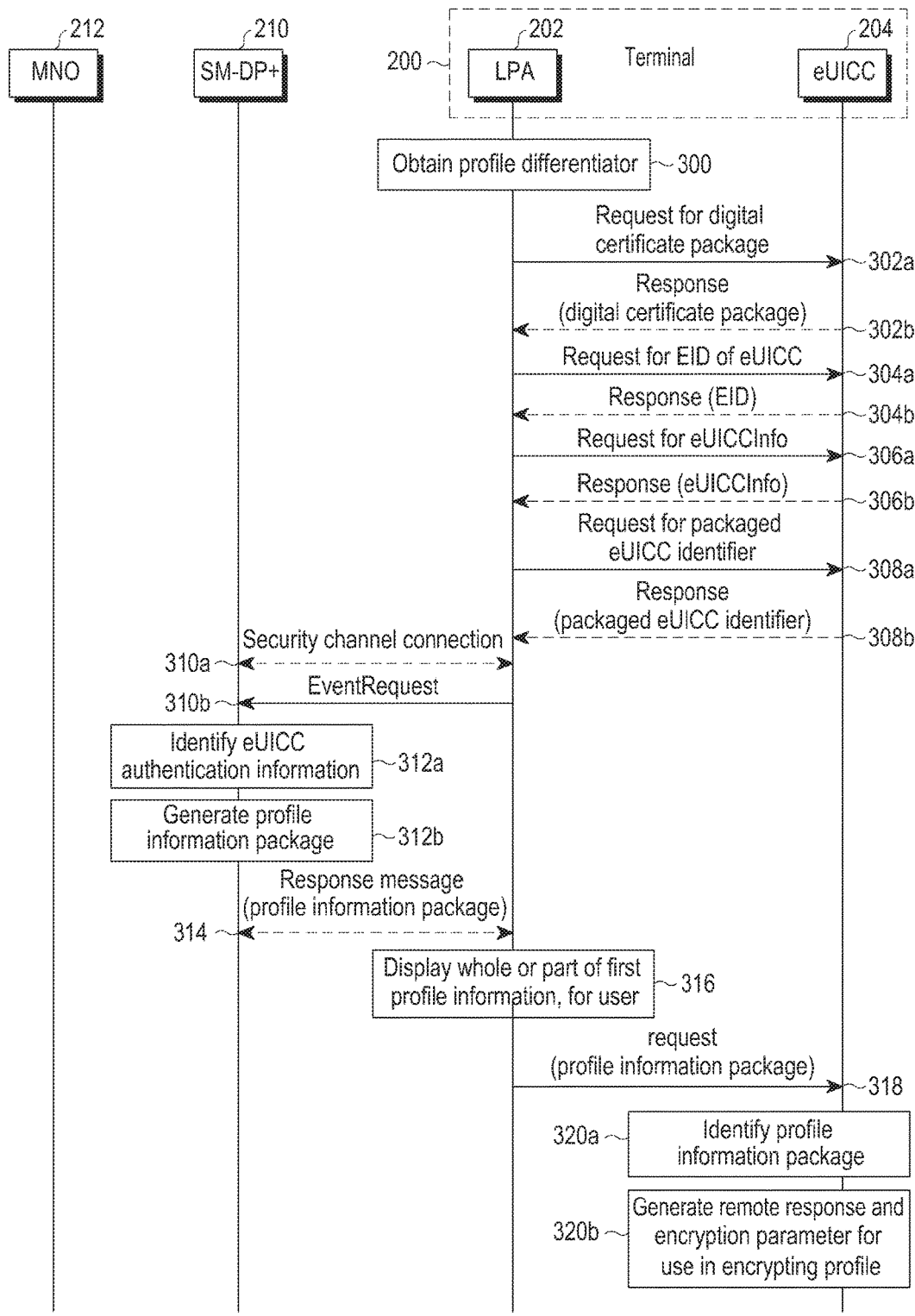
FIGS. 3A, 3B, and 3C are views illustrating a process for an eUICC to download a profile from a profile providing server according to an embodiment of the present disclosure.
Figure 3B:
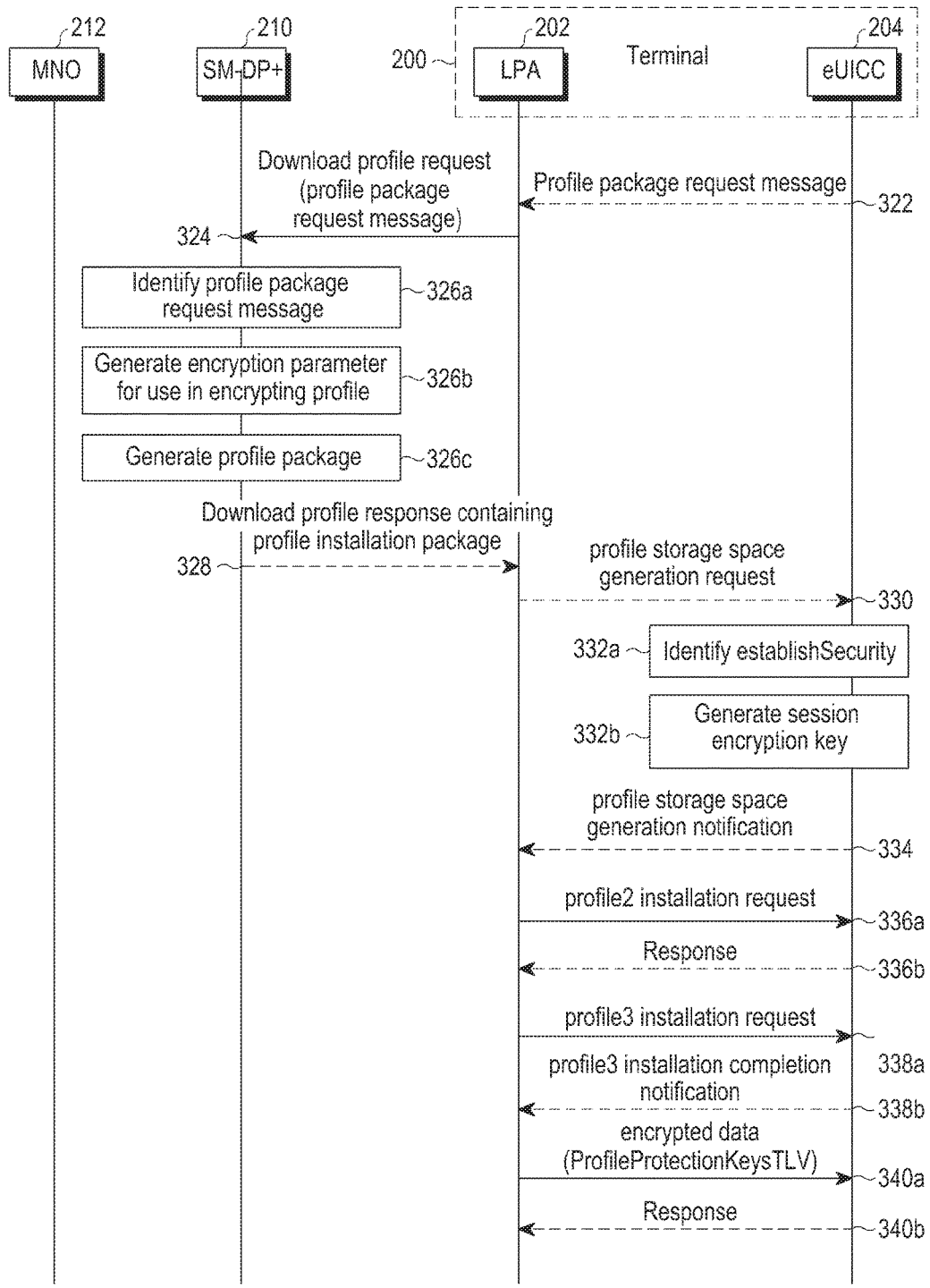
Figure 3C:
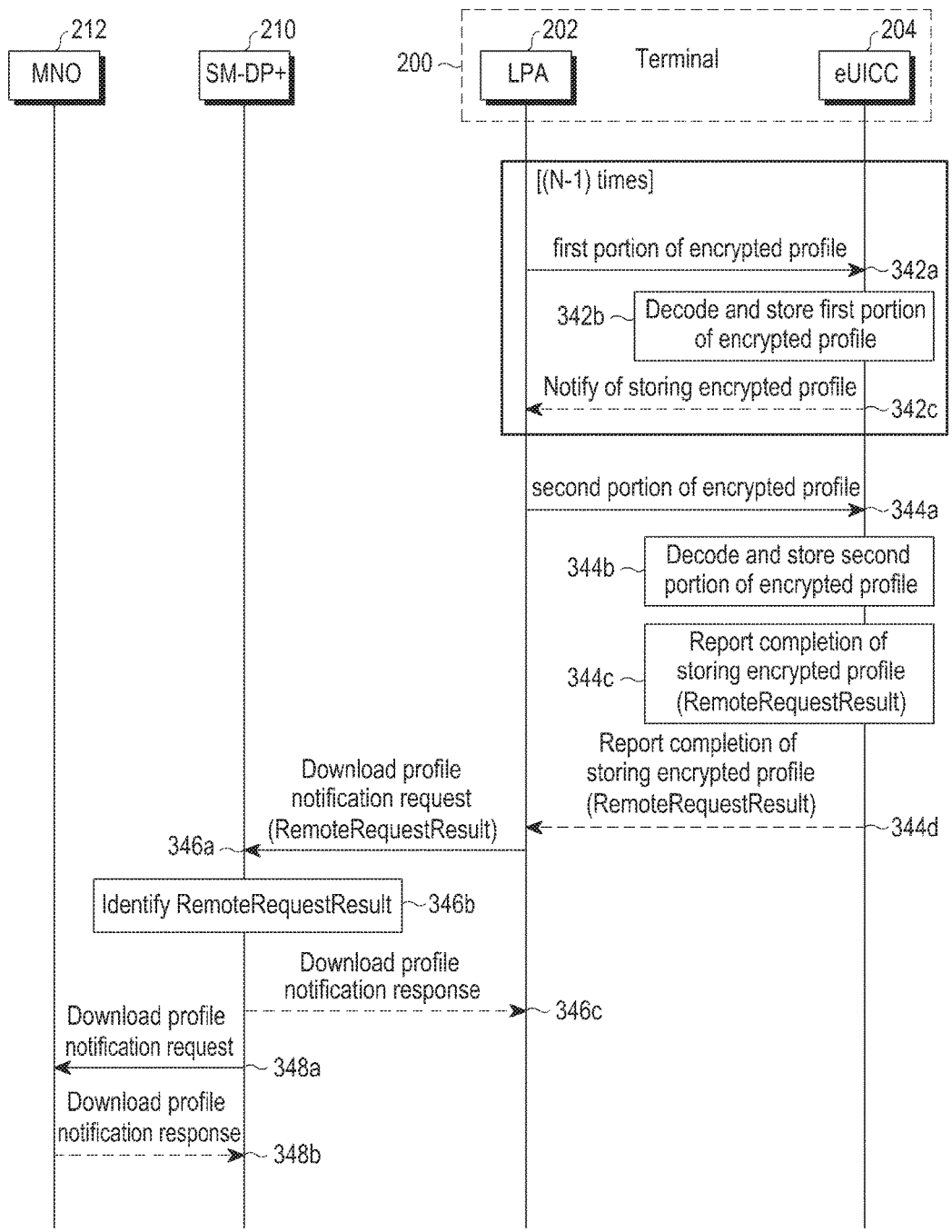

FIGS. 3A, 3B, and 3C are flowcharts illustrating example operations for a terminal having an eUICC mounted or embedded therein to download a profile for a mobile communication service from a profile providing server according to an embodiment of the present disclosure. For ease of description, the entities in FIGS. 3A to 3C are assumed to correspond to the components shown in FIG. 2.

Referring to FIGS. 3A to 3C, the LPA 202 of the terminal 200 may obtain a profile differentiator in operation 300. Here, the profile differentiator may be, e.g., a matching ID, event ID, or activation code. The LPA 202, upon obtaining the profile differentiator, may use data previously set up in the terminal, receive one from a web server, receive the user's entry of a character string, or recognize a barcode or quick response (QR) code, according to an embodiment of the present disclosure. The profile differentiator may contain the address of the profile providing server (SM-DP+). According to an embodiment of the present disclosure, the profile differentiator may include a profile ID as well as the address of the profile providing server.

In operation 302a, the LPA 202 sends a request for a digital certificate package (CERTS_eUICC) to the eUICC 204. In operation 302b, the LPA 202 may read in the digital certificate package by receiving a response containing the digital certificate package from the eUICC 204. Here, the digital certificate package may include at least one or more of a digital certificate (CERT_eUICC_ECDSA) of a corresponding eUICC, i.e., the eUICC 204, and a digital certificate (CERT_EUM_ECDSA) of the eUICC manufacturer. In the embodiment shown in FIGS. 3A to 3C, the request and response transmitted and received in operations 302a to 308b, each, may include a TLV filed constituted of a tag, length, and value. Thus, the digital certificate package may be included in the value of the TLV field and transmitted.

When obtaining the digital certificate package of the eUICC 204, the LPA 202, in operation 304a, sends a request for the identifier (EID) of the eUICC, and the LPA 202, in operation 304b, receives a response including the EID from the eUICC 204. Here, the EID may be included in the 'value' of the TLV field of the response and transmitted. In operation 306a, the LPA 202 sends a request for information (eUICCInfo) regarding the eUICC 204 to the eUICC 204, and the LPA 202, in operation 306b, receives a response including the eUICCInfo from the eUICC 204. Here, the eUICCInfo may be included in the 'value' of the TLV field of the response and transmitted. Here, the eUICCInfo may include at least one or more of a remaining storage space (MaxProfileSize) of the eUICC 204, a firmware version (MajorVersion/MinorVersion), and maximum size transmittable (MaxBlockSize) between the eUICC 204 and the LPA 202. In operation 308a, the LPA 202 sends a request for packaging to the eUICC 204. Here, the 'value' of the TLV field of the request for packaging in the eUICC may include a profile identifier (EventID). Here, the event ID may contain, e.g., an SM-DP+ Address and MatchingID.

In operation 308b, the LPA 202 receives a response including a packaged eUICC identifier (ProtectedEID) from the eUICC 204. Here, the response may also include the ProtectedEID in the 'value' of the TLV field. Here, the ProtectedEID may include at least one or more of an event ID, eUICC identifier, profile identifier, a character string (eUICC_Challenge) generated by the eUICC, and a digital signature (SIGN_eUICC) of the eUICC. The eUICC_Challenge may be generated as, e.g., a 16-byte random value. The digital signature of the eUICC may be a resultant value obtained by applying a particular operation algorithm to the whole or part of the packaged eUICC identifier using the digital certificate of the eUICC. The operation algorithm may be, e.g., a digital signature algorithm (ECDSA) or hashing.

The above-described operations 302a to 308b may be omitted in whole or part when data received by the eUICC 204 is previously stored in, e.g., a memory of the LPA 202 of the terminal 200. Further, operations 302a to 308b may be changed in order depending on implementations.

According to an embodiment of the present disclosure, the ProtectedEID or eventID may include information regarding the profile providing server (SM-DP+) 210. Thus, the LPA 202 may determine the profile providing server (SM-DP+) 210 to be connected via a security channel based on the ProtectedEID or eventID. In operation 310a, the LPA 202 may attempt to make a security channel connection to the profile providing server (SM-DP+) 210. In operation 310b, the LPA 202 may send an EventRequest for a profile to the profile providing server (SM-DP+) 210. The security channel connection may be, e.g., a transport layer security (TLS)-based hypertext transfer protocol (HTTP) connection. The EventRequest may include at least one or more of a profile identifier (EventID), a packaged eUICC identifier (ProtectedEID), a digital certificate package (CERTS_eUICC) of the eUICC, terminal information (TerminalInfo), and eUICC information (eUICCInfo). The terminal information (TerminalInfo) may include at least one or more of a terminal memory/storage size (available/total), a terminal firmware or operating system (OS) version, a terminal identifier (e.g., international mobile station equipment identity (IMEI)), and terminal modem information (ModemInfo). The eUICC information (eUICCInfo) may refer to information obtained in operations 306a and 306b. In the embodiment of FIG. 3, the profile providing server 210 firstly authenticates the terminal (LPA 202 to eUICC 204). Alternatively, however, when the terminal (LPA 202 to eUICC 204) firstly authenticates the profile providing server 210, steps 302a to 308b may be performed after step 312a. In operation 312a, the profile providing server 210 may identify the digital certificate package (CERTS_eUICC) of the eUICC contained in the profile request message received. Identifying the digital certificate package of the eUICC may include verifying the validity of the eUICC manufacturer digital certificate (CERT_EUM_ECDSA) contained in the eUICC's digital certificate package and verifying the validity of the eUICC digital certificate (CERT_eUICC_ECDSA) contained in the eUICC's digital certificate package. Thereafter, the profile providing server 210 may identify the packaged eUICC identifier (ProtectedEID) contained in the profile request message. Identifying the packaged eUICC identifier may include verifying the digital signature of the eUICC contained in the packaged eUICC identifier. Then, the profile providing server 210 may identify the profile identifier (EventID) contained in the profile request message. Identifying the profile identifier may include indexing the corresponding profile identifier in an internal database (DB) of the profile providing server 210.

In operation 312b, the profile providing server 210 may generate a profile information package (PrepareDownloadTLV) for the user determining whether to download a profile. The profile information package may include at least one or more of first profile information (ProfileInfoPart1) non-encrypted, a character string (DP_DownloadChallenge) generated by the profile providing server 210, a profile identifier (EventID), a digital certificate (CERT_DP_ECDSA) of the profile providing server 210, and a digital signature (SIGN_DP) of the profile providing server 210. The first profile information may be used for the LPA 202 to display download information to the last user, include a TLV field, and include, in the 'value' of the TLV field, at least one of a profile identifier (ProfileID), a service provider identifier (PLMNID), and text (ProfileDescription) describing, e.g., purposes of the profile. The digital signature of the profile providing server 210 may be a resultant value obtained by applying a particular operation algorithm to the whole or part of the profile information package using the digital certificate of the profile providing server 210. The operation algorithm may be, e.g., a ECDSA or hashing.

The profile providing server 210 transmits a response message (EventResponse) to the LPA 202 in operation 314, according to an embodiment of the present disclosure. Here, the response message may include at least one or more of at least one identification result of the profile information (EventID), the packaged eUICC identifier (ProtectedEID), and the digital certificate package (CERTS_eUICC) of the eUICC 204 identified by the profile providing server 210 in operation 312a, an identifier (EventType=downloadProfile) indicating that the instant procedure is one for downloading a profile, and the profile information package (PrepareDownloadTLV) generated in operation 312b. Alternatively, operation 314b may be skipped.

In operation 316, the LPA 202 may display, to the user, the whole or part of first profile identifier (ProfileInfoPart1) not encrypted and contained in the profile information package (PrepareDownloadTLV). According to an embodiment of the present disclosure, the information displayed to the user may contain a user interface for identifying the user's intention (user consent) to continue to proceed with the profile downloading procedure. According to an embodiment of the present disclosure, in operation 318, the LPA 202 may send a request containing the profile information package (PrepareDownloadTLV) to the eUICC 204. In operation 316, upon detecting an input for the user to reject the carrying out of the profile downloading procedure through the user interface, operation 318 or its subsequent operations may be omitted.

In operation 320a, the eUICC 204 may identify the profile information package (PrepareDownloadTLV). Identifying the profile information package (PrepareDownloadTLV) may include, e.g., verifying the validity of the digital certificate (CERT_DP_ECDSA) contained in the profile information package and verifying the digital signature of the profile providing server 210 contained in the profile information package.

In operation 320b, the eUICC 204 may generate an encryption parameter for use in encrypting a profile. An example of the encryption parameter may be generated in the form of a pair of secret key (eSK_eUICC_ECKA) and disposable encryption public key (ePK_eUICC_ECKA) of the eUICC 204.

And, in operation 322c, the eUICC 204 may generate a profilepackage request message (RemoteRequestResult), and transmit the generated profile package request message to the LPA 202. The profile package request message may include at least one or more of the result (Result) of identification of the profile information package (PrepareDownloadTLV) by the eUICC 204 in operation 320a, the identifier (EventType=downloadProfile) indicating that the instant procedure is one for downloading a profile, a profile identifier (EventID), an eUICC identifier (EID), the disposable encryption public key (ePK_eUICC_ECKA) of the eUICC 204 generated in operation 320b, information (eUICCInfo) regarding the eUICC 204, a character string (DP_DownloadChallenge) generated by the profile providing server 210 in operation 312b, and a digital signature (SIGN_eUICC) of the eUICC 204. The digital signature of the eUICC 204 may be a resultant value obtained by applying a particular operation algorithm to the whole or part of the profile package request message (RemoteRequestResult) using the digital certificate of the eUICC 204. The operation algorithm may be, e.g., a ECDSA or hashing.

For example, the profile package request message may further include a LPAResultinfo in the form of a TLV. Here, the value of the LPAResultinfo may include a result code and a receiver ID of the RemoteRequestResult, and the receiver ID may be an SM-SR+, an SM-DP+, or a DP+.

In operation 324, the LPA 202 may transfer, to the profile providing server 210, a DownloadProfileRequest containing the received profile package request message (RemoteRequestResult). According to an embodiment of the present disclosure, a management event, e.g., an enable, disable, or delete, in addition to the profile download request, may be delivered in the DownloadProfileRequest.

In operation 326a, the profile providing server 210 may identify the profile package request message (RemoteRequestResult) delivered by the LPA 202 in operation 324. Here, identifying the profile package request message (RemoteRequestResult) may include, e.g., verifying the digital signature of the eUICC contained in the profile package request message.

In operation 326b, the profile providing server 210 may generate an encryption parameter for use in encrypting a profile. An example of the encryption parameter may be a pair of secret key (eSK_DP_ECKA) and disposable encryption public key (ePK_DP_ECKA) of the profile providing server 210. Thereafter, the profile providing server 210 may generate a session encryption key (Session Key) using the disposable encryption public key (ePK_DP_ECKA) of the profile providing server 210 and the disposable encryption public key (ePK_eUICC_ECKA) of the eUICC 204 received in operation 324. The session encryption key may be generated based on, e.g., an encryption key generation algorithm (ECKA). According to an embodiment of the present disclosure, the generated session encryption key may be the same as a session encryption key generated by the eUICC 204 in operation 332c.

In operation 326c, the profile providing server 210 may generate a profile installation package (profileInstallPackage). Here, the profile installation package may include at least one or more of a command (establishSecurity) generating a profile storage space of the eUICC 204, a command (storeProfileInfoPart2) storing second profile information (ProfileInfoPart2) encrypted by the session encryption key (Session Key), a command (storeProfileInfoPart3) storing third profile information (ProfileInfoPart3) encrypted by the session encryption key (Session Key), data (ProfileProtectionKeysTLV) where a key (ProfileProtectionKey) used for encrypting an encrypted profile below has been encrypted by the session encryption key (Session Key), and an encrypted profile (secureProfilePackage) repeated for each item. The command (establishSecurity) generating a profile storage space of the eUICC 204 may include at least one or more of the disposable encryption public key (ePK_DP_ECKA) of the profile providing server 210, the profile identifier (EventID), and the digital signature (SIGN_DP) of the profile providing server 210. The digital signature of the profile providing server 210 may be a resultant value obtained by applying a particular operation algorithm to the whole or part of the command (establishSecurity) generating a profile storage space of the eUICC 204 using the digital certificate of the profile providing server 210. The operation algorithm may be, e.g., a ECDSA or hashing.

In operation 328, the profile providing server 210 may transfer a DownloadProfileresponse containing the profile installation package generated in operation 326c to the LPA 202.

In operation 330, the LPA 202 may transmit a profile storage space generation request containing a command (establishSecurity) generating a profile storage space of the eUICC 204 of the profile installation package received to the eUICC 204. Here, the profile storage space generation request is used to transfer parameters for session key consent in a TLV form. The 'value' of the profile storage space generation request may include a digital signature (SIGN_DP) generated by the profile providing server 210, the public key (ePK_DP_ECKA) generated by the profile providing server 210, the EventID, and a control response template (CRT) used for a key consent.

In operation 332a, the eUICC 204 may identify the command (establishSecurity) generating a profile storage space of the eUICC 204 obtained from the profile storage space generation request. Identifying the establishSecurity may include, e.g., verifying the digital signature (SIGN_DP) of the profile providing server 210 included in the establishSecurity.

In operation 332b, the eUICC 204 may generate a profile storage space (ISD-P) in the eUICC. Thereafter, the eUICC 204 may generate a session encryption key (Session Key) using the disposable encryption public key (ePK_D-P_ECKA) of the profile providing server 210 included in the establishSecurity and the disposable encryption public key (ePK_eUICC_ECKA) of the eUICC 204 generated in operation 320b. The session encryption key may be generated based on, e.g., an ECKA. According to an embodiment of the present disclosure, the generated session encryption key may be the same as the session encryption key generated by the profile providing server 210 in operation 326b.

In operation 334, the eUICC 204 may notify the LPA 202 that the profile storage space (ISD-P) has successfully been generated in the eUICC.

Then, the commands contained in the profile installation package may be sequentially transmitted to the eUICC 204 through operations 336a to 340. As a specific example, the LPA 202, in operation 336a, may transmit, to the eUICC 204, a profile2 installation request containing a command (storeProfileInfoPart2) storing encrypted second profile information of the profile installation package received in operation 328. Thereafter, the eUICC 204 may decode the second profile information (ProfileInfoPart2) contained in the command (storeProfileInfoPart2) storing the encrypted second profile information using the session encryption key generated in operation 332b and may store the decoded second profile information (ProfileInfoPart2) in the profile storage space (ISD-P) generated in operation 332b. The second profile information may be configured in a TLV form and may include, in the Value, at least one or more of the type (ProfileType) of the profile, state (ProfileState) of the profile, address (NRID/DPID) of the profile providing server, and information (MNOID) regarding the profile providing service provider. Here, the type of profile may be one of a test profile, a provisioning profile, and an operational profile.

In operation 336b, the eUICC 204 may notify the LPA 202 that the second profile information (ProfileInfoPart2) has been successfully stored in the profile storage space (ISD-P).

In operation 338a, the LPA 202 may transmit, to the eUICC 204, a profile3 installation request containing a command (storeProfileInfoPart3) storing the encrypted third profile information of the profile installation package received in operation 328. Thereafter, the eUICC 204 may decode the third profile information (ProfileInfoPart3) contained in the command (storeProfileInfoPart3) storing the encrypted third profile information using the session encryption key generated in operation 332b and may store the decoded third profile information (ProfileInfoPart3) in the profile storage unit (ISD-P) generated in operation 332b. The third profile information may include at least one or more of a character string (DP_DeleteChallenge) to be identified upon deleting the profile and a memory size (MemoryReservation) necessary for a profile deletion operation. In operation 338b, the eUICC 204 may notify the LPA 202 that the third profile information (ProfileInfoPart3) has been successfully stored in the profile storage space (ISD-P).

In operation 340a, the LPA 202 may transmit, to the eUICC 204, data (ProfileProtectionKeysTLV) where the key (ProfileProtectionKey) used to encrypt the profile in the profile installation package received in operation 328 has been encrypted by the session encryption key. Then, the eUICC 204 may decode the data (ProfileProtectionKey-sTLV) encrypted by the session encryption key using the session encryption key (Session Key) and may obtain the key (ProfileProtectionKey) used for encrypting the profile.

In operation 340b, the eUICC 204 may notify the LPA 202 that the key (ProfileProtectionKey) used for encrypting the profile has been successfully obtained.

In operation 342a, the LPA 202 may transmit, to the eUICC 204, the encrypted profile of the profile installation package received in operation 328. When the size of the encrypted profile is larger than a transmission channel bandwidth between the LPA 202 and the eUICC 204, the LPA 202 may split the encrypted profile (secureProfilePackageBlock) into a size fitting the bandwidth and send them separately n times. When the encrypted profile is split and sent, operations 342a to 342c may be repeated a number (N−1) of times as required to transmit the overall encrypted profile. With reference to FIGS. 3A to 3C, an example is described in which the encrypted profile is split twice, and a first portion and second portion as split are transmitted. However, it should be noted that, when the size of the encrypted profile is larger than an amount transmittable by such a manner, i.e., splitting twice and then sending, operations 342a and 342b may be repeated several times. In this case, the eUICC 204 may send the first portion (secureprofilepackageblock1) as split from the encrypted profile in operation 342a, and the eUICC 204, in operation 342b, may decode the received first portion split from the encrypted profile using the key (ProfileProtectionKey) used for encrypting the profile as obtained in operation 340a and may store the decoded data in the profile storage space (ISD-P).

In operation 342c, the eUICC 204 may notify the LPA of the terminal that the first portion of the encrypted profile has been successfully stored in operation 342b. In operation 344a, the LPA 202 may send the second portion (secureprofilepackageblock2) of the encrypted profile of the profile package received in operation 328 to the eUICC 204.

The eUICC 204, in operation 344b, may decode the received second portion split from the encrypted profile using the key (ProfileProtectionKey) used for encrypting the profile as obtained in operation 340a and may store the decoded data in the profile storage space (ISD-P). According to this embodiment where the encrypted profile is split and sent twice, since the eUICC 204 may install all of the profile elements in operation 344b, the storage of the encrypted profile may be complete. In operation 344c, the eUICC 204 may generate a report (RemoteRequestResult) authenticating the completion of storing the encrypted profile. Here, the report may include at least one or more of an identifier (ResultCode) indicating that the profile has been successfully and completely stored, an identifier (EventType=downloadProfile) indicating that the instant procedure is one for downloading a profile, a profile identifier (EventID), an eUICC identifier (EID), a profile-specific identifier (ProfileID), a character string (DP_Download-Challenge) as generated by the profile providing server 210 in operation 312b, an identifier (SCP03tResponse or SCP03tError) for a noticeable event that has occurred upon storing a profile, an address (DPID) of the profile providing server, a computing server address (MNOID) of a service provider (MNO) providing communication services based on a profile, and a digital signature of the eUICC. The digital signature of the eUICC 204 may be a resultant value obtained by applying a particular operation algorithm to the whole or part of the report using the digital certificate of the eUICC. The operation algorithm may be, e.g., a ECDSA or hashing. Further, after generating the report, the eUICC 204 may delete the encryption parameter generated in operation 320b, i.e., the pair of disposable encryption public key and secret key of the eUICC 204.

In operation 344d, the eUICC 204 may send, to the LPA 202, the report (RemoteRequestResult) generated in operation 344c.

In operation 346a, the LPA 202 may send, to the profile providing server 210, a download profile notification request containing the RemoteRequestResult received in operation 344d.

In operation 346b, the profile providing server 210 may identify the RemoteRequestResult received. According to an embodiment of the present disclosure, identifying the RemoteRequestResult may include verifying the digital signature of the eUICC 204 contained in the RemoteRequestResult, obtaining the identifier (SCP03tResponse or SCP03tError) regarding a noticeable event that has occurred upon storing the profile contained in the report of the eUICC 204, and obtaining the service provider computation server address (MNOID) contained in the report of the eUICC.

When the identifying process succeeds, the profile providing server 210, in operation 346c, may send a download profile notification response to the LPA 202 to notify that the RemoteRequestResult has been successfully identified.

In operation 348a, the profile providing server 210 may transfer, to the service provider's computation server (MNO, 212), a download profile notification request containing the identifier (SCP03tResponse or SCP03tError) regarding a noticeable event that has occurred upon storing the profile as obtained in operation 346b, using the service provider's computation server address (MNOID) obtained in operation 346b. According to an embodiment of the present disclosure, the MNO 212, in operation 348b, may transfer a download profile notification response to the profile providing server 210 in response to the download profile notification request.

Figure 4A:
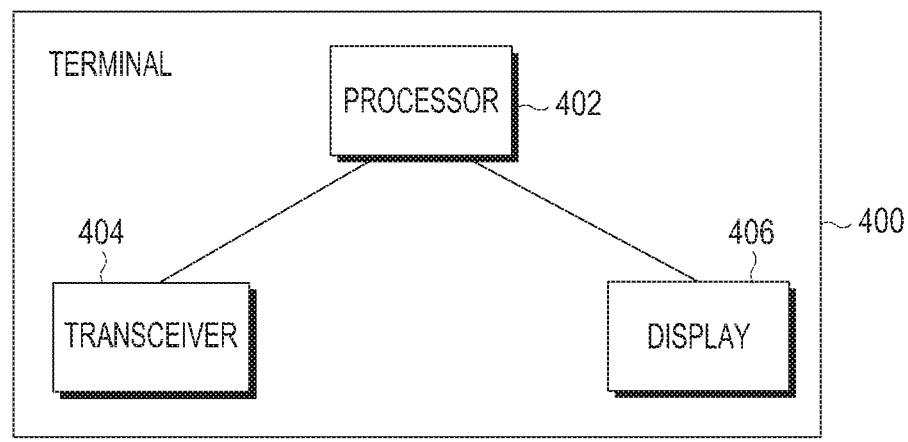
FIG. 4A is a block diagram illustrating a terminal according to an embodiment of the present disclosure.

FIG. 4A is a block diagram illustrating a terminal according to an embodiment of the present disclosure.

Referring to FIG. 4A, the terminal 400 may include, e.g., a processor 402, a transceiver 404, and a display 406. The components of the terminal shown in FIG. 4A are described in detail with reference to FIG. 4B.

Figure 4B:
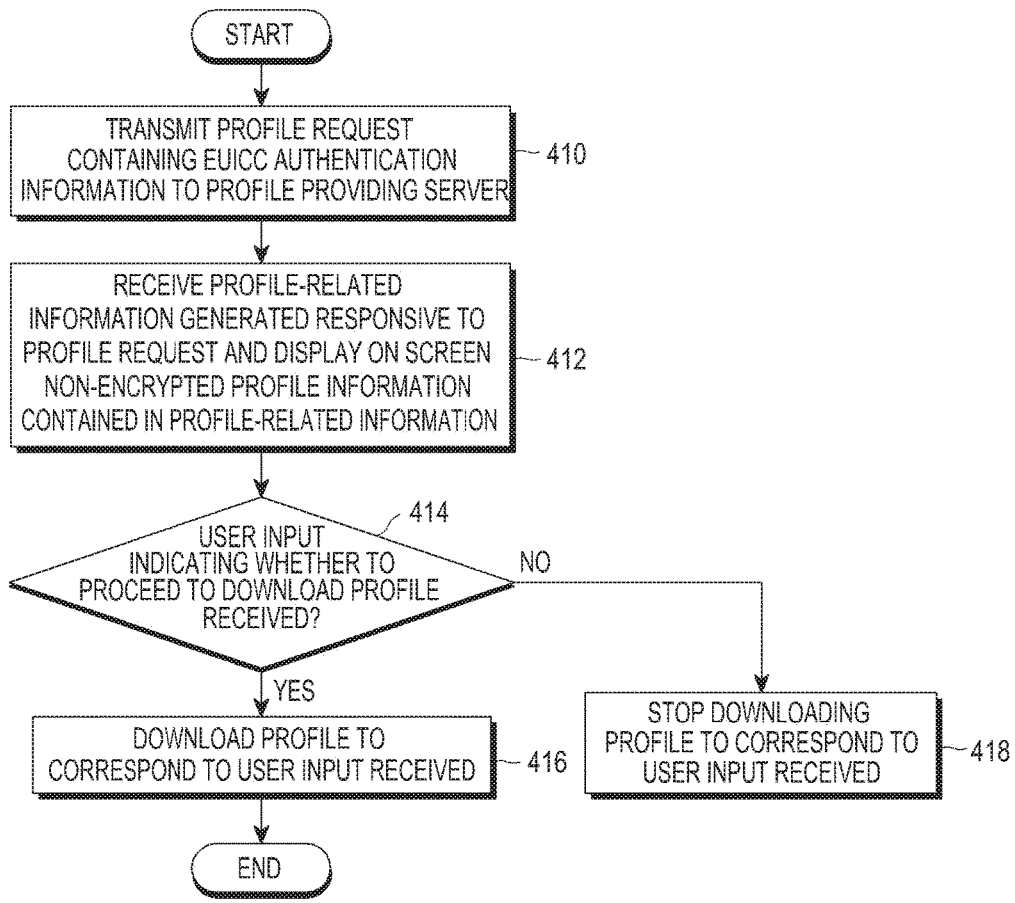
FIG. 4B is a flowchart illustrating operations of a terminal according to an embodiment of the present disclosure.

FIG. 4B is a flowchart illustrating operations of a terminal according to an embodiment of the present disclosure.

Referring to FIG. 4B, in operation 410, the processor 402 sends a profile request containing eUICC authentication information to a profile providing server. Here, the profile request may correspond to the EventRequest of operation 310b, and the eUICC authentication information may include at least one or more of a profile identifier (EventID), a packaged eUICC identifier (ProtectedEID), a digital certificate package (CERTS_eUICC) of the eUICC, terminal information (TerminalInfo), and eUICC information (eUICInfo) as contained in the eUICC authentication information of operation 310b. The respective specific definitions of the pieces of information have been set forth above, and no further description thereof is given.

In operation 412, the transceiver 404 may receive profile-related information generated in response to the profile request. Here, the profile-related information may be generated by operation 312b when verification, by the profile providing server, of the pieces of information obtained from the eUICC authentication information succeeds. The profile-related information corresponds to the profile installation package of operation 312b above and contains non-encrypted profile information. The other pieces of information contained in the profile installation package have been described above in connection with operation 312b, and no further description thereof is given. Thus, the processor 402 may control the display 406 to display the whole or part of the non-encrypted profile information on the screen. Here, the screen may include a user interface for identifying the user's intention (user consent) to continue to proceed with the profile downloading procedure. The profile-related information may be included in a response message and transmitted, as described above in connection with operation 314 which is optionally performed according to an embodiment of the present disclosure.

Hence, the processor 402, in operation 414, identifies whether a user input is received which indicates whether to proceed with the downloading of a profile. Upon reception of a user input indicating to continue proceeding with the downloading of a profile, the processor 402, in operation 416, performs the above-described operations subsequent to operation 318, to complete the downloading of the profile. As another result of the identification, the processor 402, in operation 418, may stop downloading the profile.

Figure 5A:
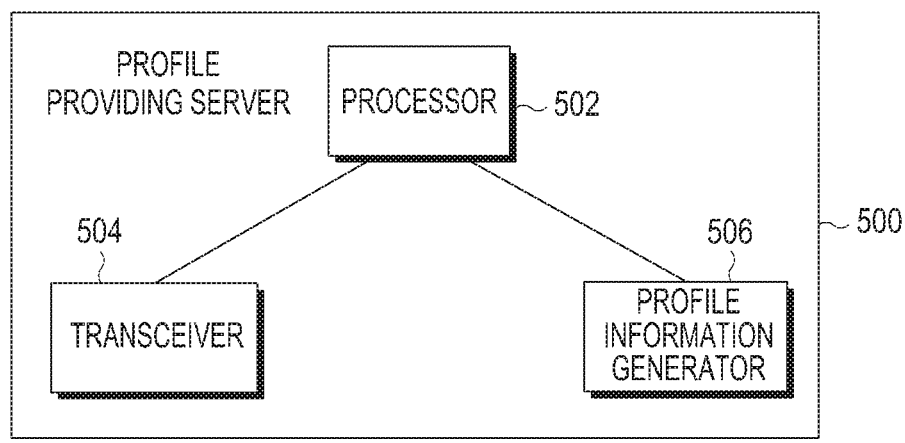
FIG. 5A is a block diagram illustrating a profile providing server according to an embodiment of the present disclosure.

FIG. 5A is a block diagram illustrating a profile providing server according to an embodiment of the present disclosure. The components of the profile providing server shown in FIG. 5A are described in detail with reference to FIG. 5B.

Referring to FIG. 5A, the profile providing server 500 may include, e.g., a processor 502, a transceiver 504, and a profile information generator 506.

Figure 5B:
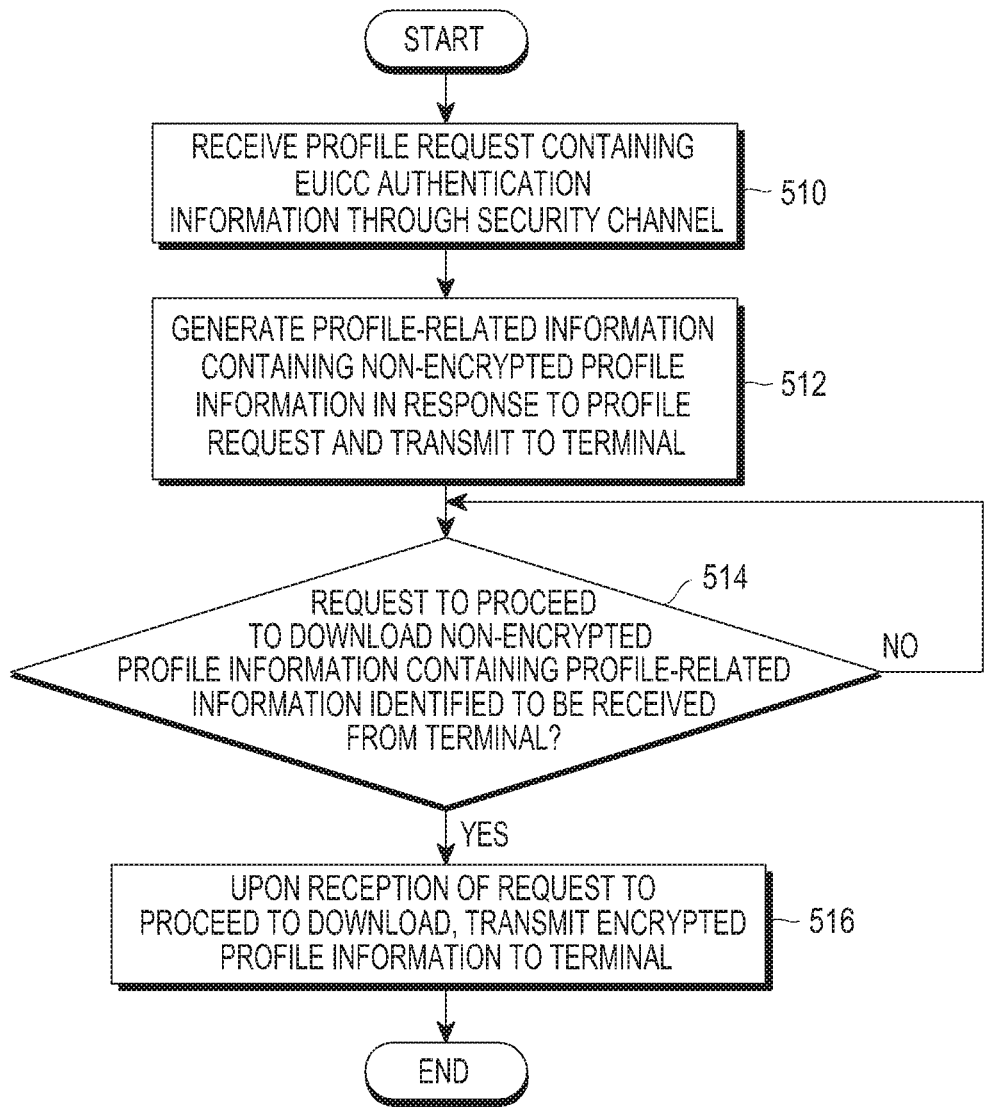
FIG. 5B is a flowchart illustrating operations of a profile providing server according to an embodiment of the present disclosure.

FIG. 5B is a flowchart illustrating operations of a profile providing server according to an embodiment of the present disclosure.

Referring to FIG. 5B, in operation 510, the transceiver 504 receives a profile request containing eUICC authentication information through a security channel. Here, the profile request corresponds to the EventRequest of operation 310b above, and the eUICC authentication information corresponds to the pieces of information contained in the eUICC authentication information of operation 310b above, no further detailed description of which is given.

In operation 512, the transceiver 504 may generate profile-related information containing non-encrypted profile information in response to the profile request and may send the profile-related information to a terminal. Here, the profile-related information may be generated by operation 312b when verification, by the processor 502, of the pieces of information obtained from the eUICC authentication information succeeds. The profile-related information corresponds to the profile information package for the user to determine whether to download a profile, corresponds to the profile information package of operation 312b above, and contains non-encrypted profile information. The profile information package may include at least one or more of first profile information (ProfileInfoPart1) non-encrypted, a character string (DP_DownloadChallenge) generated by the profile providing server 210, a profile identifier (EventID), a digital certificate (CERT_DP_ECDSA) of the profile providing server 210, and a digital signature (SIGN_DP) of the profile providing server 210. The respective specific definitions of the pieces of information have been set forth above in connection with operation 312b, and no further description thereof is given.

In operation 514, the processor 502 identifies whether to receive a request for proceeding with the downloading of the non-encrypted profile information contained in the profile-related information from the terminal. Here, the request for proceeding to download may include encryption information generated by the terminal to encrypt the profile when the eUICC 204 determines to download the profile and successfully verifies the profile information package obtained from the profile-related information as described above in connection with operation 320b. The profile-related information may be included in the response of operation 322 and transmitted, and the profile-related information may contain the pieces of information generated through operations 320b and 320c.

When identified that the request for proceeding to download has been received, the processor 502, in operation 516, sends encrypted profile information to the terminal. Sending the encrypted profile information includes verifying a digital signature of the eUICC obtained from the profile-related information in operation 326a above. When the digital signature is successfully verified, the profile providing server generates an encryption parameter for use in encrypting the profile in such a manner as in operation 326b. Here, the encryption parameter may be generated using the encryption information generated by the terminal and obtained from the profile-related information. The encrypted profile information corresponds to the profile installation package of operation 326c above. The pieces of information contained in the profile installation package have been described above in connection with operation 326c, and no further description thereof is given. Thereafter, the terminal having received the encrypted profile information may perform operations 332a to 346b from the encrypted profile information to decode the encrypted profile, store the decoded profile, and then notify the profile providing server.

When identified that the request for proceeding to download has not been received, the processor 502 may wait or stop the reception of the download proceed request.

Particular aspects of the present disclosure may be implemented in computer-readable codes on a computer-readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the present disclosure may be readily interpreted by skilled programmers in the art to which the present disclosure pertains.

The apparatuses and methods according to various embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact discs (CDs), DVDs, magnetic disks, magnetic tapes, or other optical or magnetic storage devices while retained in machine (e.g., computer)-readable storage media. The methods according to various embodiments of the present disclosure may be implemented by a computer or a portable terminal including a processor and a memory, and the memory may be a machine-readable storage medium that may properly retain program(s) containing instructions for implementing the various embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to various embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a processor transmitting the program to the graphic processing apparatus automatically or as requested by the graphic processing apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for acquiring a profile from a server by a user equipment (UE) comprising an embedded universal integrated circuit card (eUICC) and a local profile assistant (LPA), the method comprising:
generating, by the eUICC, a one-time key pair, the one-time key pair comprising:
a one-time public key of the eUICC, and
a one-time private key of the eUICC;
transmitting, by the eUICC, a one-time public key of the eUICC to the LPA;
transmitting, by the LPA, a profile package request message including the one-time public key of the eUICC to the server;
receiving, by the LPA, from the server, a profile package comprising:
encrypted profile information of the profile, and
a one-time public key of the server;
transmitting, by the LPA, the one-time public key of the server to the eUICC;
generating, by the eUICC, a session key using the one-time public key of the server and the one-time private key of the eUICC;
transmitting, by the LPA, an instruction to store the encrypted profile information to the eUICC;
decrypting, by the eUICC, the encrypted profile information using the session key; and
storing, by the eUICC, the decrypted information,
wherein the encrypted profile information comprises encrypted information related to deleting the profile.

2. The method of claim 1,
wherein the information related to deleting the profile comprising at least one of:
a character string required to delete the profile, or
a memory size required to delete the profile.

3. The method of claim 1,
wherein the encrypted profile information comprises:
a first profile information encrypted by the session key, and
a second profile information encrypted by the profile protection key, and
wherein the profile package comprises encrypted information of the profile protection key.

4. The method of claim 3,
wherein the eUICC decrypts the first profile information and the encrypted information of the profile protection key using the session key, and
wherein the eUICC decrypts the second profile information using decrypted profile protection key.

5. The method of claim 3,
wherein the first profile information comprises the encrypted information related to deleting the profile.

6. A method of claim 1, further comprising:
receiving, by the LPA, unencrypted profile information of the profile from the server; and
checking, by the LPA, whether a user input authorizing additional download of profile information identified by the unencrypted profile information is detected,
wherein if the user input is not detected, the eUICC does not generate the one-time key pair.

7. A method for providing by a server a profile to user equipment (UE), the method comprising:
receiving, from the UE, a profile package request message including a one-time public key of an embedded universal integrated circuit card (eUICC) of the UE;
generating a one-time key pair of the server, the one-time key pair comprising:
  a one-time public key of the server, and
  a one-time private key of the server;
generating a session key using the one-time secret key of the server and the one-time public key of the eUICC;
generating a profile package including encrypted profile information of the profile and a one-time public key of the server, by using the session key; and
transmitting the profile package to the UE,
wherein the encrypted profile information comprises encrypted information related to deleting the profile.

8. The method of claim 7,
wherein the information related to deleting a profile comprises at least one of:
  a character string required to delete the profile, or
  a memory size required to delete the profile.

9. The method of claim 7,
wherein the encrypted profile information comprises:
  a first profile information encrypted by the session key, and
  a second profile information encrypted by the profile protection key, and
wherein the profile package comprises encrypted information of the profile protection key.

10. The method of claim 9,
wherein the generating a profile package comprises:
  encrypting the first profile information with the session key,
  encrypting the second profile information with the profile protection key, and
  encrypting the profile protection key with the session key.

11. The method of claim 9,
wherein the first profile information comprises the encrypted information related to deleting the profile.

12. A user equipment (UE), the UE comprising:
an embedded universal integrated circuit card (eUICC); and
a local profile assistant (LPA),
wherein the eUICC is configured to:
  generate a one-time key pair, the one-time key pair comprising:
    a one-time public key of the eUICC, and
    a one-time private key of the eUICC, and
  transmit a one-time public key of the eUICC to the LPA, wherein the LPA is configured to:
    transmit a profile package request message including the one-time public key of the eUICC to a server,
    receive, from the server, a profile package comprising encrypted profile information of the profile and a one-time public key of the server, and
    transmit the one-time public key of the server to the eUICC,
wherein the eUICC is further configured to generate a session key using the one-time public key of the server and the one-time private of the eUICC,
wherein the LPA is further configured to transmit an instruction to store the encrypted profile information to the eUICC,
wherein the eUICC is further configured to:
  decrypt, the encrypted profile information using the session key, and
  store the decrypted information, and
wherein the encrypted profile information comprises encrypted information related to deleting the profile.

13. The UE of claim 12, wherein the information related to deleting the profile comprising at least one of:
  a character string required to delete the profile, or
  a memory size required to delete the profile.

14. The UE of claim 12,
wherein the encrypted profile information comprises:
  a first profile information encrypted by the session key, and
  a second profile information encrypted by the profile protection key, and
wherein the profile package comprises encrypted information of the profile protection key.

15. The UE of claim 14,
wherein the eUICC is configured to:
  decrypt the first profile information and the encrypted information of the profile protection key using the session key, and
  decrypt the second profile information using decrypted profile protection key, and
wherein the first profile information comprises the encrypted information related to deleting the profile.

16. The UE of claim 12,
wherein the LPA is configured to:
  receive unencrypted profile information of the profile from the server, and
  check whether a user input authorizing additional download of profile information identified by the unencrypted profile information is detected, and
wherein, if the user input is not detected, the eUICC does not generate the one-time key pair.

17. A server providing a profile to a user equipment (UE), the server comprising:
a transceiver; and
a processor configured to:
  receive, through the transceiver, from the UE, a profile package request message including a one-time public key of an embedded universal integrated circuit card (eUICC) of the UE,
  generate a one-time key pair of the server, the one-time key pair comprising:
    a one-time public key of the server, and
    a one-time private key of the server,
  generate a session key using the one-time secret key of the server and the one-time public key of the eUICC, generate a profile package including encrypted profile information of the profile and a one-time public key of the server, by using the session key, and transmit, through the transceiver, the profile package to the UE, wherein the encrypted profile information comprises information that information related to deleting a profile is encrypted.

18. The server of claim 17, wherein the information related to deleting a profile comprises at least one of:
  a character string required to delete the profile, or
  a memory size required to delete the profile.

19. The server of claim 17, wherein the encrypted profile information comprises:
  a first profile information encrypted by the session key, and
  a second profile information encrypted by the profile protection key, and wherein the profile package comprises encrypted information of the profile protection key.

20. The server of claim 19, wherein the processor is configured to:
  encrypt the first profile information with the session key,
  encrypt the second profile information with the profile protection key, and
  encrypt the profile protection key with the session key, and wherein the first profile information comprises the encrypted information related to deleting the profile.

* * * * *